(No Model.)
J. C. BAYLES.
COUPLING FOR FLANGED PIPES.
No. 422,065. Patented Feb. 25, 1890.
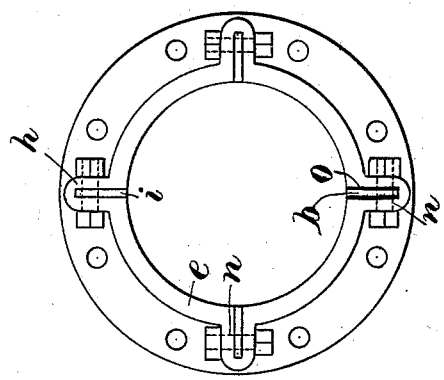
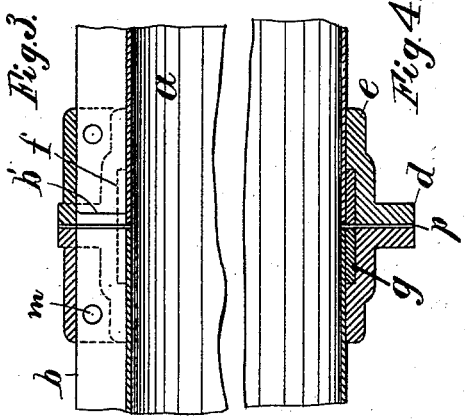
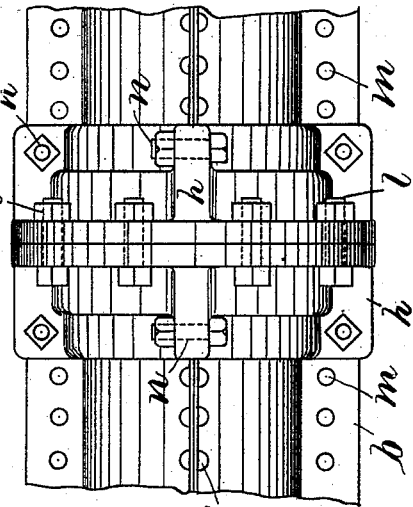
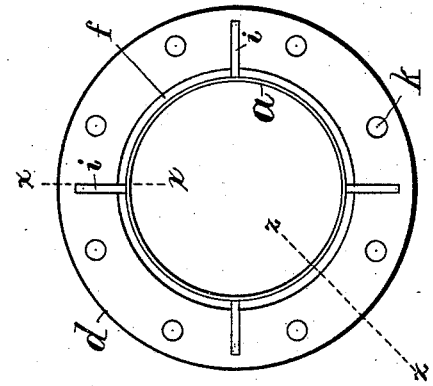
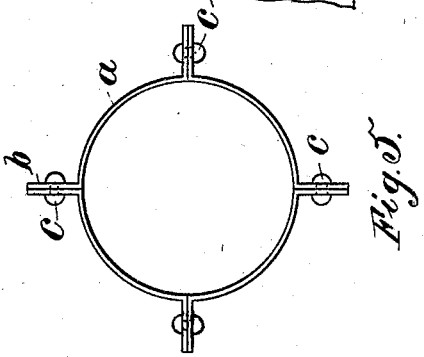
Attest:
L. Lee,
F. C. Fischer.
Inventor,
James C. Bayles,
per Crane & Miller
Attys

UNITED STATES PATENT OFFICE.

JAMES C. BAYLES, OF EAST ORANGE, NEW JERSEY.

COUPLING FOR FLANGED PIPES.

SPECIFICATION forming part of Letters Patent No. 422,065, dated February 25, 1890.

Application filed October 9, 1889. Serial No. 326,399. (No model.)

*To all whom it may concern:*

Be it known that I, JAMES C. BAYLES, a citizen of the United States, residing at East Orange, Essex county, New Jersey, have invented certain new and useful Improvements in Coupling for Flanged Pipes, fully described and represented in the following specification and the accompanying drawings, forming a part of the same.

The object of this invention is to form a tight coupling-joint for pipes having longitudinal ribs or flanges thereon. Such pipes may be made of flanged longitudinal sections, with the longitudinal flanges riveted or welded together; and the present invention is adapted to form a tight lead joint upon the end of such pipe.

The invention is also adapted to preserve the joint of the flanges at the point where the ends of the pipes are coupled, for which purpose the coupling-plates are formed with slots to admit the pipe-flanges.

The invention consists in the pipe-coupling herein shown and described.

In the annexed drawings, Figure 1 represents the face of the coupling-plate with pipe calked therein. Fig. 2 shows the back of the coupling-plate; Fig. 3, a longitudinal section of one side of the pipe-coupling on line $x\ x$ in Fig. 1; Fig. 4, a similar section on line $z\ z$ in Fig. 1; Fig. 5, an end view of the pipe alone, and Fig. 6 a side view of two pipe ends connected by the coupling. Fig. 5 shows the end of the pipe, formed in four longitudinal sections $a$, provided with radial flanges $b$, united by rivets $c$.

By the use of means already used in welding sheet metal the flanges may be united by welding instead of by the rivets $c$.

In Figs. 1 to 4 $d$ is the coupling-plate, having a bore corresponding with the diameter of the pipe $e$, its hub projecting from one side of the plate, and $f$ a recess in the coupling-plate around its bore for the calked lead packing. $g\ h$ are lugs formed upon the plate $d$, adjacent to the hub, and $i$ radial slots in the latter to receive the pipe-flanges $b$.

In Fig. 3 the pipe-flange at the left side of the joint is shown extended to the end of the pipe, but in the right side is terminated at $b'$ a little short of the joint, and a gasket or packing $p$ is shown inserted between the two plates $d$, the plates being shown in Figs. 1 and 2 provided with holes $k$, and in Fig. 6 with bolts $l$ for clamping the plates together.

Holes $m$ are shown in Fig. 3, formed through the flanges $b$ and lugs $h$, adjacent to the hub $e$, and in Figs. 2 and 6 bolts $n$ are shown inserted through the lugs and flanges to lock the coupling positively upon the pipe. To connect the coupling with the pipe, the flanged hub is slipped upon the end of the pipe with the plate $d$ nearly or quite even with the end of the pipe, the flanges $b$ entering the slots $i$, and the bolt-holes in the flanges then corresponding with the similar holes provided in the lugs.

By reference to Fig. 1 it will be observed that the flanges $b$ operate to divide the recess $f$ into four quadrantal sections, and the bolts $n$ being inserted in the holes $m$, the lead $g$ is filled in the several sections of the recess $f$.

The bolts operate to hold the coupling firmly upon the pipe, while the lead is then calked in the recesses, the calking operating to expand the lead not only against the side of the recess, but against the flanges $b$, which form the ends of the quadrantal sections. The lead thus operates to form a joint around the entire periphery of the pipe and against the flanges upon its exterior, while the bolts $m$ operate to sustain any thrust that may be brought upon the coupling, and thus prevent the coupling from working loose upon the lead.

In Fig. 1 the slots $i$ are shown of sufficient width to nearly admit the flanges $b$; but in Fig. 2 the slot is made wide enough to also admit the heads of the rivets $c$, and at the lower side of Fig. 2 a lead packing $o$ is shown inserted in the slot at each side of the flange to form a close fit between the casting and the flange.

Although I have shown the plate $d$ herein as provided with a hub on one side and the recess $f$ extending into such hub from the body of the plate, it is obvious that the hub might readily be dispensed with by suitably increasing the thickness of the plate and forming the recess $f$ exclusively in the plate.

Having thus set forth my invention, what I claim herein is—

1. The coupling for longitudinally-flanged pipes, consisting in the annular plate $d$, provided with slotted lugs $h$, projecting from one side adjacent to its bore, and the recess $f$ around the bore to receive a lead packing, substantially as herein set forth.

2. The combination, with a longitudinally-flanged pipe, of the annular coupling-plate $d$, provided with hub $e$, slotted lugs $h$, projecting from the plate adjacent to the hub-bolts $n$, fitted through the lugs and the flanges of the pipe, the annular recess $f$ within the hub adjacent to the pipe, and the lead packing $g$, calked within the recess, substantially as herein set forth.

In testimony whereof I have hereunto set my hand in the presence of two subscribing witnesses.

JAMES C. BAYLES.

Witnesses:
L. LEE,
H. J. MILLER.